US012734563B2

(12) United States Patent
Zhao et al.

(10) Patent No.: US 12,734,563 B2
(45) Date of Patent: Sep. 15, 2026

(54) CLEANING APPARATUS, CLEANING METHOD, AND BATTERY PRODUCTION SYSTEM

(71) Applicant: CONTEMPORARY AMPEREX TECHNOLOGY CO., LIMITED, Ningde (CN)

(72) Inventors: Jun Zhao, Ningde (CN); Jun Yang, Ningde (CN); Yuhang Ma, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 23 days.

(21) Appl. No.: 18/408,607

(22) Filed: Jan. 10, 2024

(65) Prior Publication Data

US 2024/0424539 A1 Dec. 26, 2024

Related U.S. Application Data

(63) Continuation of application No. PCT/CN2023/101729, filed on Jun. 21, 2023.

(51) Int. Cl.
*B08B 13/00* (2006.01)
*B08B 7/00* (2006.01)

(52) U.S. Cl.
CPC ............ *B08B 13/00* (2013.01); *B08B 7/0035* (2013.01)

(58) Field of Classification Search
CPC .......... B08B 13/00; B08B 7/0035; B08B 7/00
See application file for complete search history.

(56) References Cited

U.S. PATENT DOCUMENTS

2019/0062858 A1* 2/2019 Sanders .................... B24C 5/04

FOREIGN PATENT DOCUMENTS

| | | | | |
|---|---|---|---|---|
| CN | 109317472 A | | 2/2019 | |
| CN | 110695004 A | * | 1/2020 | ............ B08B 13/00 |
| CN | 215466698 U | | 1/2022 | |
| CN | 217393197 U | | 9/2022 | |
| CN | 217507432 U | | 9/2022 | |
| CN | 217941200 U | | 12/2022 | |

(Continued)

OTHER PUBLICATIONS

Machine translation of CN-110695004-A (Year: 2020).*
(Continued)

*Primary Examiner* — Erin F Bergner
(74) *Attorney, Agent, or Firm* — K&L Gates LLP

(57) ABSTRACT

Provided are a cleaning apparatus, a cleaning method and a battery production system, wherein the cleaning apparatus comprises: a cleaning assembly comprising two cleaning members provided opposite to each other, the two cleaning members being configured to form a space therebetween for accommodating articles to be cleaned; and a first drive assembly configured to drive the cleaning assembly for movement to clean two sides of at least two articles to be cleaned arranged in sequence. The cleaning assembly comprises two cleaning members provided opposite to each other, and the first drive assembly drives the cleaning assembly for movement, wherein the two cleaning members provided opposite to each other are capable of cleaning two sides of the at least two articles to be cleaned arranged in sequence in the course of the movement.

15 Claims, 6 Drawing Sheets

(56) References Cited

FOREIGN PATENT DOCUMENTS

| | | | |
|---|---|---|---|
| CN | 218743503 | U | 3/2023 |
| JP | H0747931 | A | 2/1995 |
| JP | 2000093912 | A | 4/2000 |
| KR | 20110135183 | A | 12/2011 |
| WO | 2019/160403 | A1 | 8/2019 |

OTHER PUBLICATIONS

Machine translation of CN 109317472 A (Year: 2019).*

International Search Report received in the corresponding international application PCT/CN2023/101729, mailed on Nov. 24, 2023.

The first office action received in EP Application No. 23 832 940.3, dated Apr. 13, 2026, 7 pages.

Office Action (with English Machine Translation), mailed May 30, 2026, for corresponding Chinese Patent Application Serial No. 202380060402.8.

* cited by examiner

CLEANING APPARATUS, CLEANING METHOD, AND BATTERY PRODUCTION SYSTEM

CROSS REFERENCE TO RELATED APPLICATION

The present application is a continuation of International Application PCT/CN2023/101729, filed on Jun. 21, 2023 and entitled "CLEANING APPARATUS, CLEANING METHOD, AND BATTERY PRODUCTION SYSTEM", which is incorporated in its entirety herein by reference.

TECHNICAL FIELD

The present application relates to the field of battery technology and, in particular, to a cleaning apparatus, a cleaning method, and a battery production system.

BACKGROUND

In some related art, the battery cell cleaning apparatus has a low cleaning efficiency and cannot well meet the production takt of the battery production system.

SUMMARY OF THE INVENTION

Some embodiments of the present application provide a cleaning apparatus, a cleaning method, and a battery production system, which are used to alleviate the problem of low cleaning efficiency.

Some embodiments of the present application provide a cleaning apparatus, comprising: a cleaning assembly comprising two cleaning members provided opposite to each other, the two cleaning members being configured to form a space therebetween for accommodating articles to be cleaned; and a first drive assembly configured to drive the cleaning assembly for movement to clean two sides of at least two articles to be cleaned arranged in sequence.

The cleaning assembly comprises two cleaning members provided opposite to each other, and the first drive assembly drives the cleaning assembly for movement, wherein the two cleaning members provided opposite to each other are capable of cleaning two sides of the at least two articles to be cleaned arranged in sequence in the course of the movement, resulting in a high degree of automation and a high efficiency of cleaning, which is conducive to realizing a continuous production function and meeting the production takt of the battery production system.

In some embodiments, the cleaning apparatus further comprises a sensor provided in the cleaning assembly, the sensor being configured to detect the distance between the cleaning members and the articles to be cleaned.

In the cleaning process, the sensor detects the distance between the cleaning members and the articles to be cleaned in real time, and the detected distance value detected by the sensor can be used to judge whether the distance between the cleaning members and the articles to be cleaned is too small or too large, and can thus be used to alleviate the problem of the articles to be cleaned being damaged due to the cleaning members touching the articles to be cleaned as a result of the distance between the cleaning members and the articles to be cleaned being too small, and to alleviate the problem of reduced cleaning effect as a result of the distance between the cleaning members and the articles to be cleaned being too large.

In some embodiments, the sensor comprises a laser sensor.

The laser sensor uses laser ranging, which results in high detection precision and can improve the fool proof effect in the cleaning process, thus increasing the product yield rate.

In some embodiments, the cleaning apparatus further comprises a controller that is respectively electrically connected to the sensor and the first drive assembly, the controller being configured to receive a detected distance value detected by the sensor and compare it with a preset distance value therein, and control the first drive assembly to stop working when the detected distance value is less than or equal to the preset distance value.

In the cleaning process, the sensor detects the distance between the cleaning members and the articles to be cleaned in real time, and sends the detected distance value to the controller, and the controller, after receiving the detected distance value detected by the sensor, compares the detected distance value with the preset distance value therein, and it is capable of controlling the first drive assembly to stop working when the detected distance value is less than or equal to the preset distance value, resulting in a high degree of automation, so that the first drive assembly no longer drives the cleaning assembly for movement, and the cleaning assembly stops the cleaning work; therefore, it is possible to alleviate the problem of the articles to be cleaned being damaged due to the cleaning members touching the articles to be cleaned as a result of the distance between the cleaning members and the articles to be cleaned being too small.

In some embodiments, the cleaning apparatus further comprises an adjusting assembly configured to adjust the distance between the two cleaning members.

The adjusting assembly is capable of adjusting the distance between the two cleaning members according to the size of the articles to be cleaned, in order to be suitable for cleaning articles to be cleaned of different sizes, so as to enable easy model replacement of articles to be cleaned. Moreover, adjusting the distance between the two cleaning members by the adjusting assembly can alleviate the problem of the distance between the cleaning members and the articles to be cleaned being too small or too large.

In some embodiments, the cleaning apparatus further comprises a second drive assembly configured to drive the cleaning assembly to move in a first direction, wherein the first direction intersects respectively with a second direction and a third direction, the second direction being parallel to a direction of arrangement of the at least two articles to be cleaned, and the third direction being parallel to a direction of arrangement of the two cleaning members.

The second drive assembly drives the cleaning assembly in the first direction and is capable of adjusting the position of the cleaning assembly on the two sides of the article to be cleaned so as to be used for enabling the cleaning assembly to reach the cleaning position and for enabling the two sides of the article to be cleaned to be completely cleaned.

In some embodiments, the first drive assembly is drivably connected to the second drive assembly to cause the second drive assembly to move in the second direction, the second drive assembly being connected to the cleaning assembly.

The first drive assembly drives the second drive assembly to move in the second direction, and the second drive assembly is connected to the cleaning assembly, and in turn is capable of driving the cleaning assembly to move in the second direction to cause the cleaning assembly to clean two sides of at least two articles to be cleaned arranged in sequence in the second direction. Moreover, the second drive assembly can drive the cleaning assembly in the first direction and is capable of adjusting the position of the cleaning assembly on the two sides of the article to be cleaned so as to be used for enabling the cleaning assembly to reach the cleaning position and for enabling the two sides of the article to be cleaned to be completely cleaned.

In some embodiments, the cleaning apparatus further comprises an adjusting assembly, the adjusting assembly being connected to the second drive assembly and the cleaning assembly, and the adjusting assembly being configured to adjust a distance between the two cleaning members in the third direction.

The adjusting assembly is capable of adjusting the distance between the two cleaning members in the third direction according to the size of the articles to be cleaned, in order to be suitable for cleaning articles to be cleaned of different sizes, so as to enable easy model replacement of articles to be cleaned. Moreover, adjusting the distance between the two cleaning members in the third direction by the adjusting assembly can alleviate the problem of the distance between the cleaning members and the articles to be cleaned being too small or too large.

In some embodiments, the cleaning apparatus further comprises a sensor provided in the cleaning assembly, the sensor being configured to detect the distance between the cleaning members and the articles to be cleaned in the third direction during the movement of the cleaning assembly in the first direction.

In the process of the second drive assembly driving the cleaning assembly for movement in the first direction to adjust the position of the cleaning assembly on the two sides of the articles to be cleaned, the sensor detects the distance between the cleaning members and the articles to be cleaned in the third direction in real time, and the detected distance value detected by the sensor can be used to judge whether the distance between the cleaning members and the articles to be cleaned is too small or too large, and can thus be used to alleviate the problem of the articles to be cleaned being damaged due to the cleaning members touching the articles to be cleaned as a result of the distance between the cleaning members and the articles to be cleaned being too small, and to alleviate the problem of reduced cleaning effect as a result of the distance between the cleaning members and the articles to be cleaned being too large.

In some embodiments, the cleaning apparatus further comprises a frame body, the first drive assembly being disposed in the frame body in the second direction, the second drive assembly being disposed in the frame body in the first direction, and the cleaning assembly being disposed in the frame body and located on a side of the first drive assembly that is located in the first direction.

Within the frame body, the first drive assembly is provided in the second direction and the second drive assembly is provided in the first direction, and the cleaning assembly is connected to the second drive assembly, and the entire cleaning apparatus is integrated into the frame body, so that the structural arrangement is compact and reasonable.

In some embodiments, at least one of the first drive assembly and the second drive assembly comprises a linear servo motor.

The linear servo motor provides accurate speed control and position control with rapid response.

In some embodiments, the cleaning apparatus further comprises a support assembly comprising: a support plate configured to support a pallet member carrying the at least two articles to be cleaned; and a positioning member provided in the support plate and configured to be detachably connected to the pallet member.

After the pallet member carries the at least two articles to be cleaned arranged in sequence into the cleaning apparatus, the support plate supports the pallet member and is connected to the pallet member by means of the positioning member, thus enabling the positioning of the pallet member to prevent shifting of the pallet member in the cleaning process.

In some embodiments, the cleaning apparatus further comprises two conveyor members arranged at an interval, the two conveyor members being configured to convey the pallet member; the support assembly being disposed between the two conveyor members, and the support assembly comprising a fixed plate and a telescopic member, wherein the telescopic member connects the fixed plate and the support plate, and the telescopic member is configured to drive the support plate to push up the pallet member to disengage the pallet member from the two conveyor members.

After the pallet member carries the at least two articles to be cleaned arranged in sequence and is fed into the cleaning position of the cleaning apparatus through the two conveyor members, the telescopic member drives the support plate to lift up so as to push up the pallet member to disengage the pallet member from the two conveyor members, which makes it possible to prevent abrasion of the conveyor members in the process of cleaning the articles to be cleaned, and it is connected to the pallet member by means of a positioning member, thus enabling the positioning of the pallet member to prevent shifting of the pallet member in the cleaning process.

In some embodiments, the cleaning apparatus further comprises a frame body, the first drive assembly being disposed in an upper portion within the frame body, the support assembly being disposed in a lower portion within the frame body, and the cleaning assembly being suspended between the first drive assembly and the support assembly.

The support assembly and the first drive assembly are integrally provided in the frame body, wherein the support plate of the support assembly located in the lower portion supports the pallet member, and the support plate is connected to the pallet member by the positioning member, so that it is capable of positioning the pallet member to prevent the pallet member from shifting in the cleaning process; and the first drive assembly located in the upper portion drives the cleaning assembly to move in the second direction, so as to cause the cleaning assembly to clean two sides of at least two articles to be cleaned arranged in sequence in the second direction, such a structural arrangement being compact and reasonable.

In some embodiments, the cleaning member comprises a plasma cleaning member.

The plasma cleaning member performs plasma cleaning of the articles to be cleaned. Plasma cleaning is a kind of dry cleaning, which mainly relies on the "activation effect" of the active ions in the plasma to remove the dirt, dust, etc., on articles to be cleaned, so as to prepare for the stacking and welding of battery cells in advance, so as to minimize the defective products of welding.

Some embodiments of the present application further provide a battery production system, comprising a battery cell providing apparatus and the cleaning apparatus as described above, the article to be cleaned comprising a battery cell provided by the battery cell providing apparatus.

The battery production system includes the cleaning apparatus of any of the above embodiments and accordingly has the beneficial effect of the cleaning apparatus.

Some embodiments of the present application further provide a cleaning method for the cleaning apparatus described above, which comprises the step of: driving the cleaning assembly by the first drive assembly for movement, the two cleaning members of the cleaning assembly cleaning two sides of the at least two articles to be cleaned arranged in sequence.

The cleaning apparatus drives the cleaning assembly by the first drive assembly for movement, wherein the two cleaning members provided opposite to each other are capable of cleaning two sides of the at least two articles to be cleaned arranged in sequence in the course of the movement, resulting in a high degree of automation and a high efficiency of cleaning, which is conducive to realizing a continuous production function and meeting the production takt of the battery production system.

In some embodiments, wherein the cleaning apparatus further comprises a sensor provided in the cleaning assembly, the cleaning method further comprising: detecting, by the sensor, the distance between the cleaning members and the articles to be cleaned in the process of cleaning the two sides of the at least two articles to be cleaned arranged in sequence by the two cleaning members, and controlling the first drive assembly to stop working when the detected distance value detected by the sensor is less than or equal to the preset distance value.

In the cleaning process, the sensor detects the distance between the cleaning members and the articles to be cleaned in real time, and the detected distance value detected by the sensor can be used to judge whether the distance between the cleaning members and the articles to be cleaned is too small or too large, and when the detected distance value detected by the sensor is less than or equal to the preset distance value, the first drive assembly is controlled to stop working, so that the first drive assembly no longer drives the cleaning assembly for movement, and the cleaning assembly stops the cleaning work; therefore, it is possible to alleviate the problem of the articles to be cleaned being damaged due to the cleaning members touching the articles to be cleaned as a result of the distance between the cleaning members and the articles to be cleaned being too small.

In some embodiments, wherein the cleaning apparatus further comprises a second drive assembly, the cleaning method further comprising: driving, before driving the cleaning assembly by the first drive assembly for movement, the cleaning assembly by the second drive assembly for movement in a first direction to cause the two cleaning members to be located on two sides of the article to be cleaned, and adjust the position of the two cleaning members in the first direction, wherein the first direction intersects respectively with a second direction and a third direction, the second direction being parallel to a direction of arrangement of the at least two articles to be cleaned, and the third direction being parallel to a direction of arrangement of the two cleaning members.

The second drive assembly drives the cleaning assembly in the first direction and is capable of adjusting the position of the cleaning assembly on the two sides of the article to be cleaned so as to be used for enabling the cleaning assembly to reach the cleaning position and for enabling the two sides of the article to be cleaned to be completely cleaned.

In some embodiments, wherein the cleaning apparatus further comprises a sensor provided in the cleaning assembly, the cleaning method further comprising: detecting, by the sensor, the distance between the cleaning members and the articles to be cleaned in the third direction in the process of driving the cleaning assembly by the second drive assembly for movement in the first direction, and controlling the second drive assembly to stop working when the detected distance value detected by the sensor is less than or equal to the preset distance value.

In the process of the second drive assembly driving the cleaning assembly for movement in the first direction to adjust the position of the cleaning assembly on the two sides of the articles to be cleaned, the sensor detects the distance between the cleaning members and the articles to be cleaned in the third direction in real time, and when the detected distance value detected by the sensor is less than or equal to the preset distance value, the second drive assembly is controlled to stop working, so that the second drive assembly no longer drives the cleaning assembly for movement; therefore, it is possible to alleviate the problem of the articles to be cleaned being damaged due to the cleaning members touching the articles to be cleaned as a result of the distance between the cleaning members and the articles to be cleaned being too small.

DESCRIPTION OF DRAWINGS

In order to more clearly illustrate the technical solutions of embodiments of the present application, the following is a brief description of the accompanying drawings to be used in embodiments of the present application. It is obvious that the accompanying drawings described below are only some embodiments of the present application, and other accompanying drawings can be obtained according to the accompanying drawings without any creative work for a person of ordinary skill in the art.

Figure 1:
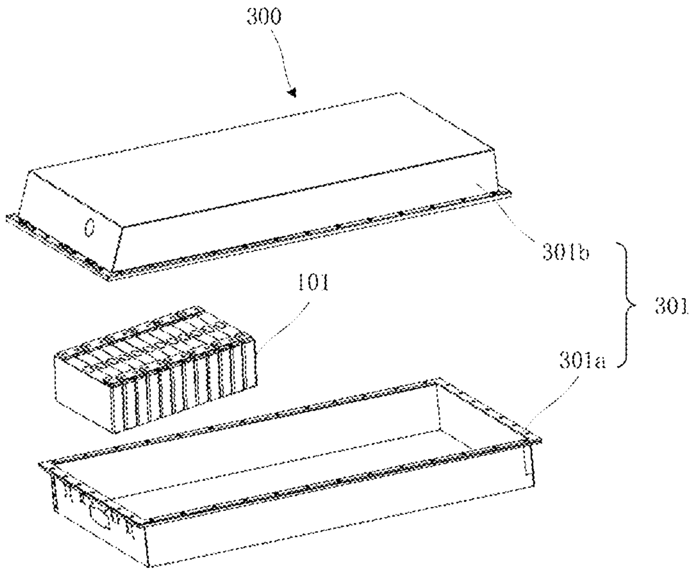
FIG. 1 is a structural schematic diagram of a battery provided according to some embodiments of the present application.

In the accompanying drawings, the accompanying drawings are not drawn to actual scale.

Description of reference numerals: 1—cleaning assembly; 11—cleaning member; 111—plasma cleaning member; 12—first pipeline; 13—second pipeline; 2—first drive assembly; 21—first power member; 211—first linear servo motor; 22—first guide rail; 23—drag chain; 3—sensor; 31—laser sensor; 4—controller; 5—adjusting assembly; 51—mounting plate; 52—connecting member; 53—second guide rail; 54—adjusting member; 55—slider; 6—second drive assembly; 61—second power member; 611—second linear servo motor; 62—first plate member; 63—second plate member; 64—first guide member; 7—frame body; 8—support assembly; 81—support plate; 82—positioning member; 83—fixed plate; 84—telescopic member; 85—second guide member 86—first position-limiting member; 87—second position-limiting member; 88—first detecting member; 9—conveyor member; 10—second detecting member; 20—suspension assembly; 201—suspension member; 202—third guide rail; 203—auxiliary suspension member; 100—article to be cleaned; 101—battery cell; 200—pallet member; 300—battery; 301—shell assembly; 301*a*—box body; 301*b*—cover body.

DETAILED DESCRIPTION

Embodiments of the present application will be described in further detail hereinafter in conjunction with the accompanying drawings and embodiments. The following detailed description of the embodiments and the drawings are used to illustrate the principles of the present application by way of example, but should not be used to limit the scope of the present application, that is, the present application is not limited to the described embodiments.

In the description of the present application, it should be noted that, unless otherwise stated, "plurality of" means two or more; the orientation or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore will not be interpreted as limiting the present application. In addition, the terms "first", "second" and "third" are only used for descriptive purposes, and cannot be construed as indicating or implying relative importance. "Perpendicular" does not mean being perpendicular in the strict sense, but within the permissible range of error. "Parallel" does not mean being parallel in the strict sense, but within the permissible range of error.

Orientation words appearing in the following description are all directions shown in the drawings, and do not limit the specific structure of the present application. In the description of the present application, it should also be noted that, unless otherwise expressly specified and defined, the terms "install", "connected" and "connect" should be understood in a broad sense, for example, they may be fixedly connected, detachably connected or integrally connected; and they may be directly connected or indirectly connected through an intermediate medium. For those of ordinary skill in the art, the specific meanings of the above terms in the present application may be understood according to specific circumstances.

With the vigorous promotion of new energy vehicles, new energy batteries have been widely developed. In order to improve the assembly efficiency of batteries, the various tasks of battery assembly are generally operated on the assembly line. The assembly process of a battery comprises stacking and assembling multiple battery cells in a case, whereas the cells need to be subjected to cleaning and glue coating processing before being stacked. In some related art, the battery cell cleaning process is carried out by means of decentralized stations and cooperation between operators, and it does not have a continuous production function, which is not only less efficient in cleaning, but also more dependent on operators, making it unfavorable to a certain extent for the quality control of the battery cell products.

On this basis, some embodiments of the present application provide a cleaning apparatus, a cleaning method, and a battery production system which are used to alleviate the problem of low cleaning efficiency for battery cells.

Referring to FIG. 1, in some embodiments, a battery 300 of the present application includes a shell assembly 301 and at least one battery cell 101. The shell assembly 301 is internally of a hollow structure, and the at least one battery cell 101 is accommodated within the shell assembly 301. The shell assembly 301 may comprise two portions, which are referred to herein as a box body 301*a* and a cover body 301*b*, respectively. The box body 301*a* and the cover body 301*b* are disposed opposite to each other and are snapped to form a box body having a closed cavity. The at least one battery cell 101 comprises multiple battery cells 101 in the number of two or more, and the multiple battery cells 101 may be connected to each other in series or in parallel or in a mixed connection, the mixed connection being a mixture of series and parallel connections. The multiple battery cells 101 are combined in parallel or in series with each other or in mixed combinations and then placed inside the closed cavity formed by snapping the box body 301*a* and the cover body 301*b*.

The battery 300 of the present application can be used in an electrical apparatus and can provide electrical energy to the electrical apparatus. The electrical apparatus may be a cell phone, a portable device, a laptop computer, a battery vehicle, an electric vehicle, a ship, a spacecraft, an electric toy, and an electric tool, among others. For example, the spacecraft include airplanes, rockets, space shuttles and spaceships. The electric toy may include a stationary or mobile electric toy, for example, a game console, an electric car toy, an electric ship toy, and an electric aircraft toy, and the like. The electric tool comprises a metal cutting electric tool, a grinding electric tool, an assembly electric tool and a railway electric tool, such as an electric drill, an electric grinder, an electric wrench, an electric screwdriver, an electric hammer, an impact drill, a concrete vibrator and an electric planer.

The electrical apparatus of the present application may be a vehicle, such as a new energy vehicle, which may be a pure electric vehicle, a hybrid vehicle or an extended range electric vehicle, etc. Alternatively, the electrical apparatus may also be a drone or a ship, etc.

Figure 2:
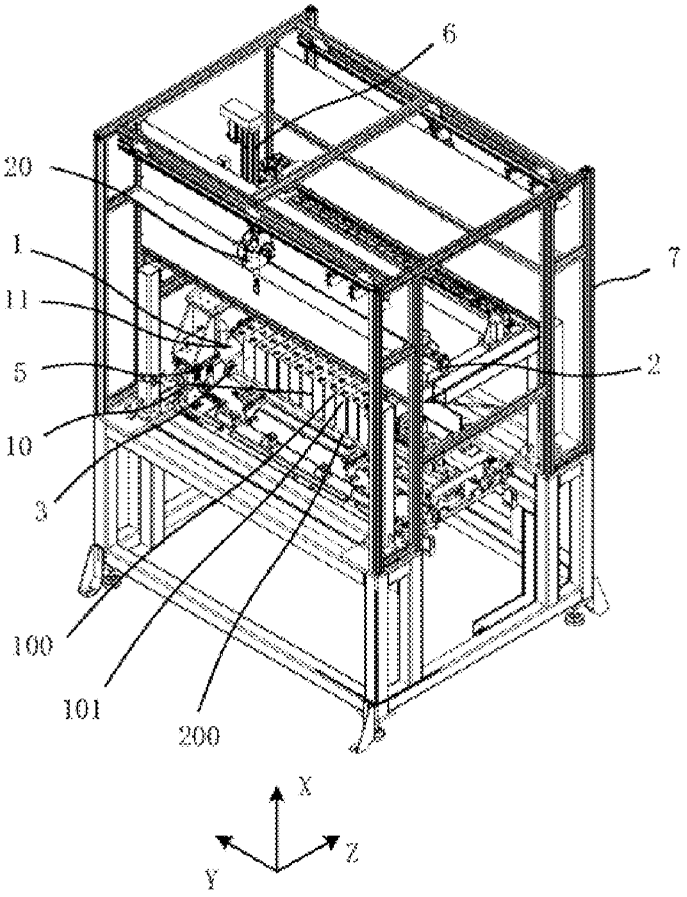
FIG. 2 is a schematic diagram of a state in which a cleaning apparatus provided according to some embodiments of the present application cleans articles to be cleaned.
Figure 3:
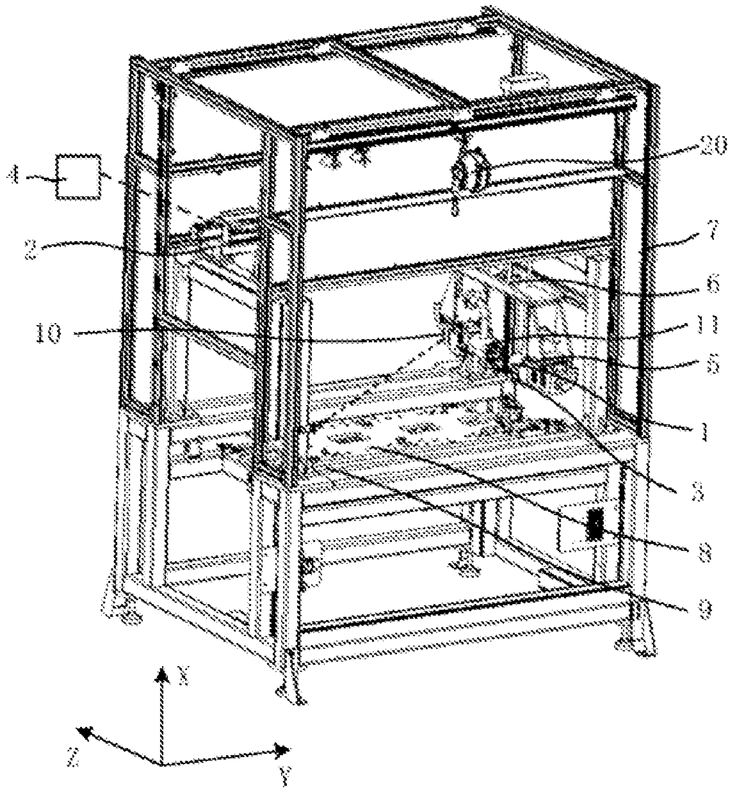
FIG. 3 is a structural schematic diagram of a cleaning apparatus provided according to some embodiments of the present application.
Figure 4:
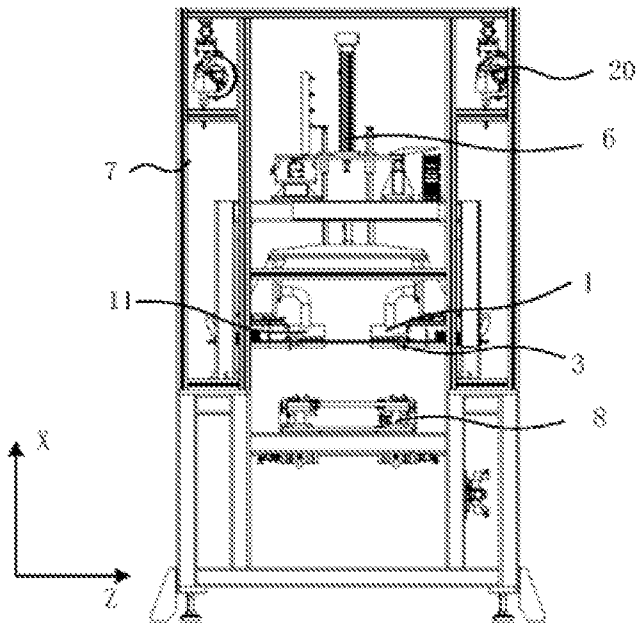
FIG. 4 is a side view schematic diagram of a cleaning apparatus provided according to some embodiments of the present application.

Referring to FIGS. 2 to 4, some embodiments of the present application provide a cleaning apparatus, the cleaning apparatus comprising a cleaning assembly 1. The cleaning assembly 1 comprises two cleaning members 11 provided opposite to each other. The two cleaning members 11 are configured to form a space therebetween for accommodating articles to be cleaned 100.

The cleaning apparatus further comprises a first drive assembly 2, the first drive assembly 2 being drivably coupled to the cleaning assembly 1. The first drive assembly

2 is configured to drive the cleaning assembly 1 for movement to clean two sides of at least two articles to be cleaned 100 arranged in sequence.

The cleaning assembly 1 comprises two cleaning members 11 provided opposite to each other, and the first drive assembly 2 drives the cleaning assembly 1 for movement, wherein the two cleaning members 11 provided opposite to each other are capable of cleaning two sides of the at least two articles to be cleaned 100 arranged in sequence in the course of the movement, resulting in a high degree of automation and a high efficiency of cleaning, which is conducive to realizing a continuous production function and meeting the production takt of the battery production system.

In some embodiments, the cleaning apparatus further comprises a sensor 3 provided in the cleaning assembly 1, the sensor 3 being configured to detect the distance between the cleaning members 11 and the articles to be cleaned 100.

In the cleaning process, the sensor 3 detects the distance between the cleaning members 11 and the articles to be cleaned 100 in real time, and the detected distance value detected by the sensor 3 can be used to judge whether the distance between the cleaning members 11 and the articles to be cleaned 100 is too small or too large, and can thus be used to alleviate the problem of the articles to be cleaned 100 being damaged due to the cleaning members 11 touching the articles to be cleaned 100 as a result of the distance between the cleaning members 11 and the articles to be cleaned 100 being too small, and to alleviate the problem of reduced cleaning effect as a result of the distance between the cleaning members 11 and the articles to be cleaned 100 being too large.

In some embodiments, the sensor 3 comprises a laser sensor 31.

The laser sensor 31 uses laser ranging, which results in high detection precision and can improve the fool proof effect in the cleaning process, thus increasing the product yield rate.

In some embodiments, the cleaning apparatus further comprises a controller 4. The controller 4 is respectively electrically connected to the sensor 3 and the first drive assembly 2. The controller 4 is configured to receive a detected distance value detected by the sensor 3 and compare it with a preset distance value therein, and control the first drive assembly 2 to stop working when the detected distance value is less than or equal to the preset distance value. The cleaning assembly 1 stops moving and stops cleaning work. the distance between the cleaning members 11 and the articles to be cleaned 100 is adjusted so that the distance between the cleaning members 11 and the articles to be cleaned 100 is greater than the preset distance value.

In the cleaning process, the sensor 3 detects the distance between the cleaning members 11 and the articles to be cleaned 100 in real time, and sends the detected distance value to the controller 4, and the controller 4, after receiving the detected distance value detected by the sensor 3, compares the detected distance value with the preset distance value therein, and it is capable of controlling the first drive assembly 2 to stop working when the detected distance value is less than or equal to the preset distance value, resulting in a high degree of automation, so that the first drive assembly 2 no longer drives the cleaning assembly 1 for movement, and the cleaning assembly 1 stops the cleaning work; therefore, it is possible to alleviate the problem of the articles to be cleaned 100 being damaged due to the cleaning members 11 touching the articles to be cleaned 100 as a result of the distance between the cleaning members 11 and the articles to be cleaned 100 being too small.

In some embodiments, the controller 4 is also electrically connected to the cleaning assembly 1. The controller 4 is configured to control the cleaning assembly 1 to start the cleaning work or to stop the cleaning work.

The controller 4 is configured to receive the detected distance value detected by the sensor 3 and compare it with the preset distance value therein, and control the first drive assembly 2 to stop working when the detected distance value is less than or equal to the preset distance value, so that the first drive assembly 2 no longer drives the cleaning assembly 1 for movement, and the controller 4 also controls the cleaning assembly 1 to stop the cleaning work.

In some embodiments, the cleaning apparatus further comprises an adjusting assembly 5, the adjusting assembly 5 being configured to adjust the distance between the two cleaning members 11.

The adjusting assembly 5 is capable of adjusting the distance between the two cleaning members 11 according to the size of the articles to be cleaned 100, in order to be suitable for cleaning articles to be cleaned 100 of different sizes, so as to enable easy model replacement of articles to be cleaned 100. Moreover, adjusting the distance between the two cleaning members 11 by the adjusting assembly 5 can alleviate the problem of the distance between the cleaning members 11 and the articles to be cleaned 100 being too small or too large.

In some embodiments, the cleaning apparatus further comprises a second drive assembly 6. The second drive assembly 6 is configured to drive the cleaning assembly 1 for movement in a first direction X.

Here, the first direction X intersects respectively with a second direction Y and a third direction Z; the second direction Y being parallel to a direction of arrangement of the at least two articles to be cleaned 100; and the third direction Z being parallel to a direction of arrangement of the two cleaning members 11.

In some embodiments, the first direction X is perpendicular respectively to the second direction Y and the third direction Z, and the second direction Y is perpendicular to the third direction Z. Optionally, the first direction X is parallel to the vertical direction and the second direction Y and the third direction Z are located in a horizontal plane.

The second drive assembly 6 drives the cleaning assembly 1 for movement in the first direction X and is capable of adjusting the position of the cleaning assembly 1 on the two sides of the article to be cleaned 100 so as to be used for enabling the cleaning assembly 1 to reach the cleaning position and for enabling the two sides of the article to be cleaned 100 to be completely cleaned.

In some embodiments, the second drive assembly 6 drives the cleaning assembly 1 for movement in the first direction X to cause the cleaning assembly 1 to be located in an upper cleaning position on two sides of the article to be cleaned 100, so as to clean the upper region on the two sides of the article to be cleaned 100, and, after the cleaning of the upper region on the two sides of the article to be cleaned 100 is completed, the cleaning assembly 1 is driven by the second drive assembly 6 for movement in the first direction X to cause the cleaning assembly 1 to be located in a lower cleaning position on the two sides of the article to be cleaned 100, so as to clean the lower region on the two sides of the article to be cleaned 100.

Of course, the adjustment of the position of the cleaning assembly 1 by the second drive assembly 6 is not limited to the upper cleaning position and the lower cleaning position on the two sides of the article to be cleaned 100. In the case where the article to be cleaned 100 is of an excessive size in the first direction X, the article to be cleaned 100 may be divided into three or more cleaning positions along the first direction X. The second drive assembly 6 drives the cleaning assembly 1 for movement in the first direction X to cause the cleaning assembly 1 to be located in turn at each of the cleaning positions on the two sides of the article to be cleaned 100, so that the two sides of the article to be cleaned 100 can be completely cleaned.

In some embodiments, the first drive assembly 2 is drivably connected to the second drive assembly 6 to cause the second drive assembly 6 to move in the second direction Y, the second drive assembly 6 being connected to the cleaning assembly 1.

The first drive assembly 2 drives the second drive assembly 6 for movement in the second direction Y, and the second drive assembly 6 is connected to the cleaning assembly 1, and in turn is capable of driving the cleaning assembly 1 for movement in the second direction Y to cause the cleaning assembly 1 to clean two sides of at least two articles to be cleaned 100 arranged in sequence in the second direction Y. Moreover, the second drive assembly 6 is capable of driving the cleaning assembly 1 for movement in the first direction X and is capable of adjusting the position of the cleaning assembly 1 on the two sides of the article to be cleaned 100 so as to be used for enabling the cleaning assembly 1 to reach the cleaning position and for enabling the two sides of the article to be cleaned 100 to be completely cleaned.

In some embodiments, the cleaning apparatus further comprises an adjusting assembly 5, the adjusting assembly 5 being connected to the second drive assembly 6 and the cleaning assembly 1, and the adjusting assembly 5 being configured to adjust a distance between the two cleaning members 11 in the third direction Z.

The adjusting assembly 5 is capable of adjusting the distance between the two cleaning members 11 in the third direction Z according to the size of the articles to be cleaned 100, in order to be suitable for cleaning articles to be cleaned 100 of different sizes, so as to enable easy model replacement of articles to be cleaned 100. Moreover, adjusting the distance between the two cleaning members 11 in the third direction Z by the adjusting assembly 5 can alleviate the problem of the distance between the cleaning members 11 and the articles to be cleaned 100 being too small or too large. The adjusting assembly 5 is also connected to the second drive assembly 6, where the second drive assembly 6 is capable of driving the cleaning assembly 1 for movement in the first direction X by the adjusting assembly 5, while the first drive assembly 2 is capable of driving the second drive assembly 6 for movement in the second direction Y, which in turn drives the cleaning assembly 1 for movement in the second direction Y, resulting in a compact structure, thus making it possible to realize adjustment of the position of the cleaning assembly 1 in the first direction X, and movement in the second direction Y, and to realize adjustment of the distance between the two cleaning members 11 in the third direction Z.

In some embodiments, the cleaning apparatus further comprises a sensor 3 provided in the cleaning assembly 1. The sensor 3 is configured to detect the distance between the cleaning members 11 and the articles to be cleaned 100 in the third direction Z during the movement of the cleaning assembly 1 in the first direction X.

In the process of the second drive assembly 6 driving the cleaning assembly 1 for movement in the first direction X to adjust the position of the cleaning assembly 1 on the two sides of the articles to be cleaned 100, the sensor 3 detects the distance between the cleaning members 11 and the articles to be cleaned 100 in the third direction in real time, and the detected distance value detected by the sensor 3 can be used to judge whether the distance between the cleaning members 11 and the articles to be cleaned 100 is too small or too large, and can thus be used to alleviate the problem of the articles to be cleaned 100 being damaged due to the cleaning members 11 touching the articles to be cleaned 100 as a result of the distance between the cleaning members 11 and the articles to be cleaned 100 being too small, and to alleviate the problem of reduced cleaning effect as a result of the distance between the cleaning members 11 and the articles to be cleaned 100 being too large.

In some embodiments, the cleaning apparatus further comprises a controller 4. The controller 4 is respectively electrically connected to the sensor 3 and the second drive assembly 6. The controller 4 is configured to receive a detected distance value detected by the sensor 3 and compare it with a preset distance value therein, and control the second drive assembly 6 to stop working when the detected distance value is less than or equal to the preset distance value. The cleaning assembly 1 stops moving and adjusts the distance between the cleaning members 11 and the articles to be cleaned 100 so that the distance between the cleaning members 11 and the articles to be cleaned 100 is greater than the preset distance value.

In the process of the second drive assembly 6 driving the cleaning assembly 1 for movement in the first direction X to adjust the position of the cleaning assembly 1 on the two sides of the articles to be cleaned 100, the sensor 3 detects the distance between the cleaning members 11 and the articles to be cleaned 100 in the third direction in real time, and sends a detected distance value to the controller 4, and the controller 4 is capable of controlling the second drive assembly 6 to stop working when the detected distance value received from the sensor 3 is less than or equal to the preset distance value therein, resulting in a high degree of automation, so that the second drive assembly 6 no longer drives the cleaning assembly 1 for movement; therefore, it is possible to alleviate the problem of the articles to be cleaned 100 being damaged due to the cleaning members 11 touching the articles to be cleaned 100 as a result of the distance between the cleaning members 11 and the articles to be cleaned 100 being too small.

In some embodiments, the cleaning apparatus further comprises a frame body 7, the first drive assembly 2 being disposed in the frame body 7 in the second direction Y, the second drive assembly 6 being disposed in the frame body 7 in the first direction X, and the cleaning assembly 1 being disposed in the frame body 7 and located on a side of the first drive assembly 2 that is located in the first direction X.

Within the frame body 7, the first drive assembly 2 is provided in the second direction Y and the second drive assembly 6 is provided in the first direction X, and the cleaning assembly 1 is connected to the second drive assembly 6, and the entire cleaning apparatus is integrated into the frame body 7, so that the structural arrangement is compact and reasonable. The first drive assembly 2 is capable of driving the second drive assembly 6 for movement in the second direction Y, and in turn is capable of driving the cleaning assembly 1 for movement in the second direction Y to cause the cleaning assembly 1 to clean two sides of at least two articles to be cleaned 100 arranged in sequence in the second direction Y; moreover, the second drive assembly 6 is capable of driving the cleaning assembly 1 for movement in the first direction X and is capable of adjusting the position of the cleaning assembly 1 on the two sides of the article to be cleaned 100 so as to be used for enabling the cleaning assembly 1 to reach the cleaning position and for enabling the two sides of the article to be cleaned 100 to be completely cleaned.

In some embodiments, at least one of the first drive assembly 2 and the second drive assembly 6 comprises a linear servo motor.

The linear servo motor provides accurate speed control and position control with rapid response. After determining the model and size of the article to be cleaned 100, by successfully cleaning one article to be cleaned 100, the angular displacement or angular velocity of the linear servo motor can be recorded to output the corresponding position and movement velocity of the cleaning assembly 1, and for the subsequent articles to be cleaned 100, the linear servo motor can accurately control the position and movement velocity of the cleaning assembly 1 in accordance with the above record, thereby realizing the successful cleaning of the articles to be cleaned 100 without the need for repeatedly adjusting the position of the cleaning assembly 1, thus improving the cleaning efficiency.

Figure 5:
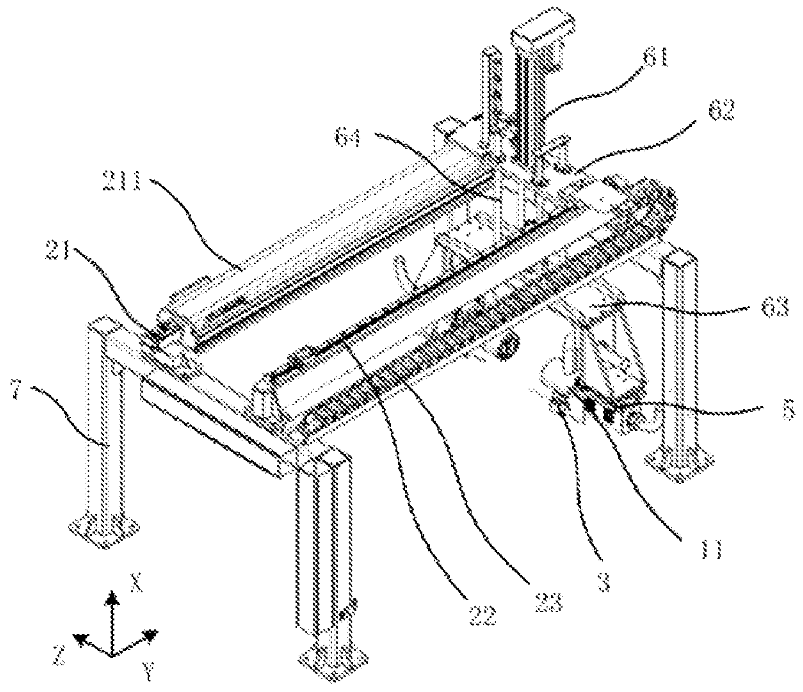
FIG. 5 is a schematic diagram of a first drive assembly, a second drive assembly, and a cleaning assembly of the cleaning apparatus provided according to some embodiments of the present application.
Figure 6:
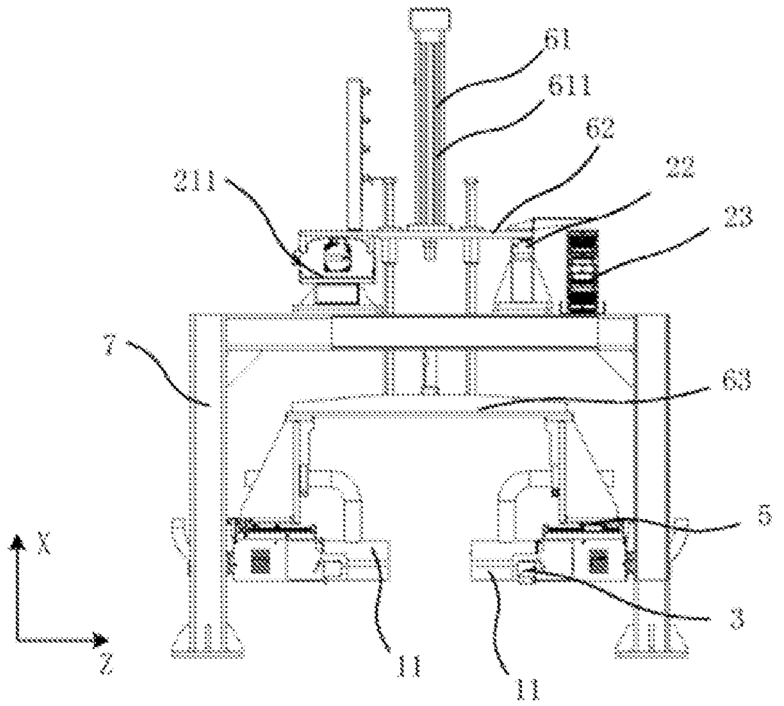
FIG. 6 is a side view schematic diagram of FIG. 5.

Referring to FIGS. 5 and 6, in some embodiments, the first drive assembly 2 includes a first power member 21. Optionally, the first power member 21 comprises a first linear servo motor 211, the first linear servo motor 211 being disposed in the frame body 7 and extending in the second direction Y. The first drive assembly 2 further comprises a first guide rail 22, the first guide rail 22 being arranged at an interval from the first linear servo motor 211, and the extension direction of the first guide rail 22 is parallel to the extension direction of the first linear servo motor 211. The first linear servo motor 211 provides power to drive the second drive assembly 6 for movement, and the second drive assembly 6 is spanned over the first linear servo motor 211 and the first guide rail 22. The first drive assembly 2 further comprises a drag chain 23, the drag chain 23 being used for electric wires and the like of the first linear servo motor 211 to pass through and for protection of the electric wires.

Referring to FIGS. 5 and 6, in some embodiments, the second drive assembly 6 comprises a second power member 61. Optionally, the second power member 61 comprises a second linear servo motor 611.

The first drive assembly 2 further comprises a first plate 62 and a second plate 63. The first plate 62 is slidably spanned over the first linear servo motor 211 and the first guide rail 22, and the first plate 62 is driven by the first linear servo motor 211 so that it can move in the second direction Y. The second linear servo motor 611 is provided on the first plate 62 and is driveably connected to the second plate 63, and the cleaning assembly 1 and the adjusting assembly 5 are provided on the second plate 63. The second linear servo motor 611 drives the second plate 63 for movement in the first direction X relative to the first plate 62, so as to drive the cleaning assembly 1 and the adjusting assembly 5 for movement in the first direction X.

The first drive assembly 2 further comprises a first guide member 64. The first guide member 64 connects the first plate 62 and the second plate 63. The first guide member 64 guides the second plate 63 in the process of the second plate 63 moving in the first direction X relative to the first plate 62.

Optionally, the first guide member 64 comprises a guide shaft or a guide rod.

Figure 7:
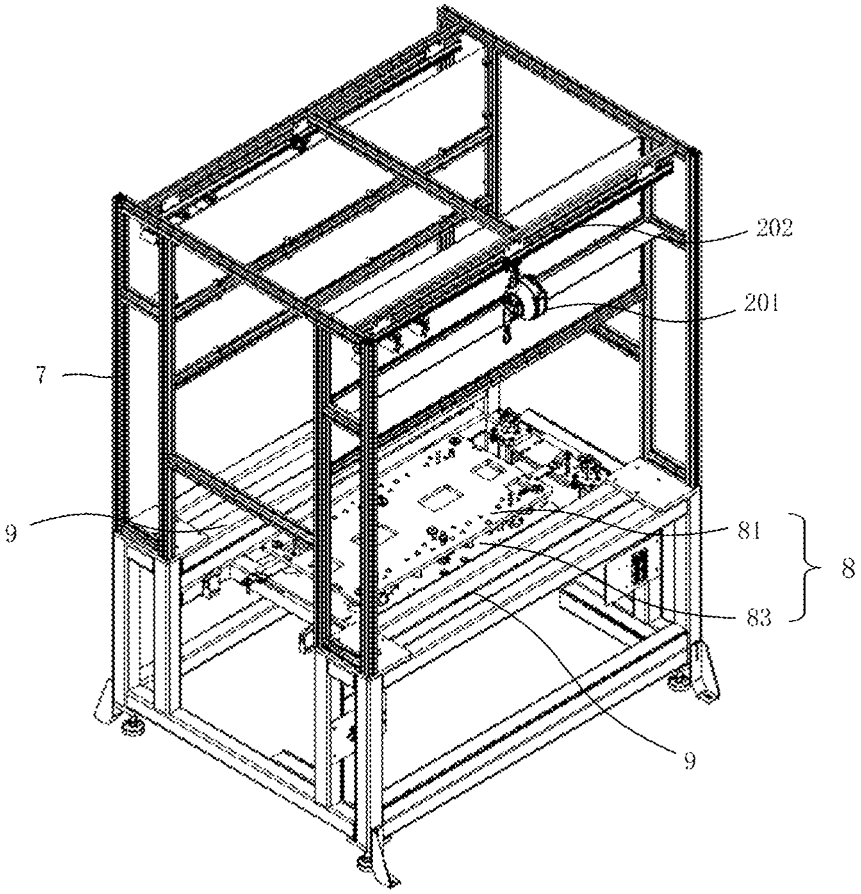
FIG. 7 is a schematic diagram of a frame, a support assembly and a suspension assembly of the cleaning apparatus provided according to some embodiments of the present application.
Figure 8:
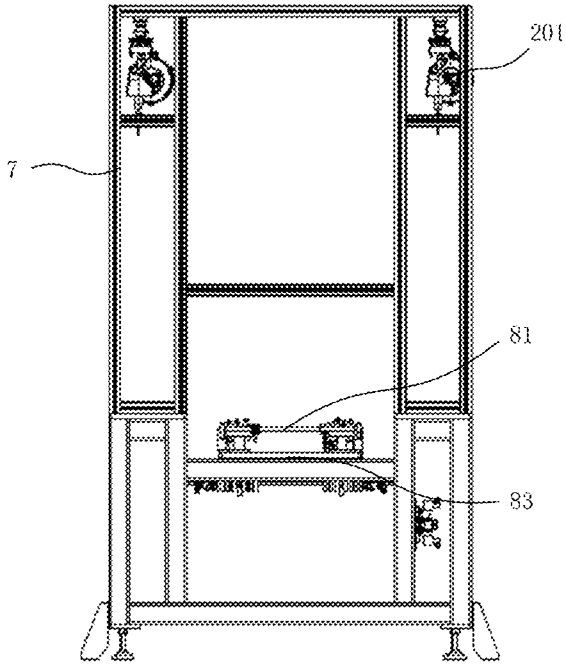
FIG. 8 is a side view schematic diagram of FIG. 7.
Figure 9:
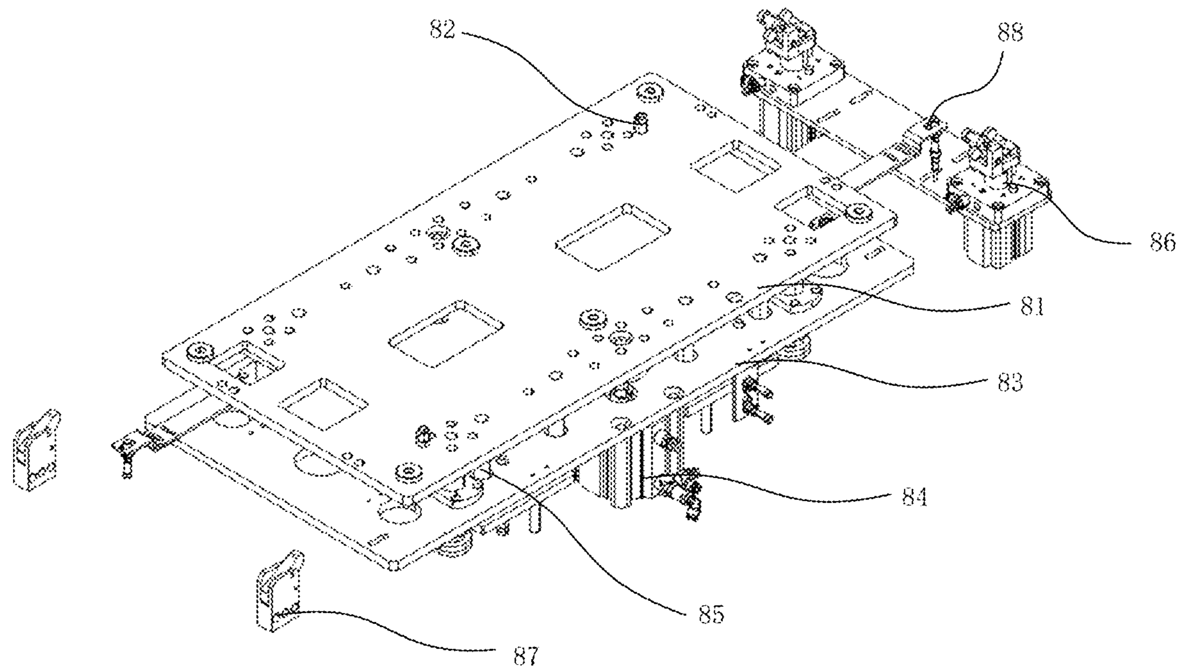
FIG. 9 is a schematic diagram of a support assembly of the cleaning apparatus provided according to some embodiments of the present application.

Referring to FIGS. 7, 8 and 9, in some embodiments, the cleaning apparatus further comprises a support assembly 8. The support assembly 8 comprises a support plate 81, the support plate 81 being configured to support a pallet member 200 (referring to FIG. 2) carrying the at least two articles to be cleaned 100.

The support assembly 8 further comprises a positioning member 82, the positioning member 82 being provided in the support plate 81 and configured to be detachably connected to the pallet member 200.

The cleaning apparatus provided in embodiments of the present application can clean the at least two articles to be cleaned 100 arranged in sequence, and the at least two articles to be cleaned 100 arranged in sequence can be fed into the cleaning apparatus by the pallet member 200. After the pallet member 200 carries the at least two articles to be cleaned 100 arranged in sequence into the cleaning apparatus, the support plate 81 supports the pallet member 200 and is connected to the pallet member 200 by means of the positioning member 82, thus enabling the positioning of the pallet member 200 to prevent shifting of the pallet member 200 in the cleaning process.

In some embodiments, the cleaning apparatus further comprises two conveyor members 9 that are arranged at an interval. The two conveyor members 9 are configured to convey the pallet member 200.

The support assembly 8 is provided between the two conveyor members 9.

In some embodiments, the support assembly 8 comprises a fixed plate 83 and a telescopic member 84. The telescopic member 84 connects the fixed plate 83 and the support plate 81. The telescopic member 84 is configured to drive the support plate 81 to push up the pallet member 200 to disengage the pallet member 200 from the two conveyor members 9.

In the retracted state of the telescopic member 84, the height of the support plate 81 is lower than the height of the conveyor member 9, whereas when the telescopic member 84 is extended, it pushes up the support plate 81 and is capable of making the height of the support plate 81 higher than the height of the conveyor member 9, which in turn can push the pallet member 200 up to be disengaged from the two conveyor members 9.

After the pallet member 200 carries the at least two articles to be cleaned 100 arranged in sequence and is fed into the cleaning position of the cleaning apparatus through the two conveyor members 9, the telescopic member 84 drives the support plate 81 to lift up so as to push up the pallet member 200 to disengage the pallet member 200 from the two conveyor members 9, which makes it possible to prevent abrasion of the conveyor members 9 in the process of cleaning the articles to be cleaned 100, and it is connected to the pallet member 200 by means of a positioning member 82, thus enabling the positioning of the pallet member 200 to prevent shifting of the pallet member 200 in the cleaning process.

In some embodiments, the telescopic member 84 comprises a linear motor, an oil cylinder or an air cylinder.

In some embodiments, the positioning member 82 comprises a positioning pin, the bottom of the pallet member 200 is correspondingly provided with a positioning hole, the telescopic member 84 drives the support plate 81 to lift up and support the pallet member 200, and the positioning pin is inserted in the positioning hole to realize the positioning of the pallet member 200.

In some embodiments, the support assembly 8 further comprises a second guide member 85, the second guide member 85 connects the support plate 81 and the fixed plate 83, and in the process of the telescopic member 84 driving the support plate 81 for movement relative to the fixed plate 83, the second guide member 85 guides the movement of the support plate 81.

Optionally, the second guide member 85 comprises a guide rod or a guide shaft.

Referring to FIG. 9, in some embodiments, the support assembly 8 further comprises a first position-limiting member 86 and a second position-limiting member 87. After the pallet member 200 carrying the at least two articles to be cleaned 100 arranged in sequence reaches the cleaning position of the cleaning apparatus, the pallet member 200 is position-limited by the first position-limiting member 86 to prevent the pallet member 200 from continuing to move forward due to inertia, and the pallet member 200 is position-limited by the second position-limiting member 87 to prevent the pallet member 200 from slipping backward.

In some embodiments, the support assembly 8 further comprises a first detecting member 88, the first detecting member 88 being used to detect whether the pallet member 200 is moved forwardly into place.

Referring to FIGS. 2 to 4, in some embodiments, the cleaning apparatus further comprises a frame body 7, the first drive assembly 2 being disposed in an upper portion within the frame body 7, the support assembly 8 being disposed in a lower portion within the frame body 7, and the cleaning assembly 1 being suspended between the first drive assembly 2 and the support assembly 8.

The support assembly 8 and the first drive assembly 2 are integrally provided in the frame body 7, wherein the support plate 81 of the support assembly 8 located in the lower portion supports the pallet member 200, and the support plate 81 is connected to the pallet member 200 by the positioning member 82, so that it is capable of positioning the pallet member 200 to prevent the pallet member 200 from shifting in the cleaning process; and the first drive assembly 2 located in the upper portion drives the cleaning assembly 1 to move in the second direction Y, so as to cause the cleaning assembly 1 to clean two sides of at least two articles to be cleaned 100 arranged in sequence in the second direction Y, such a structural arrangement being compact and reasonable.

In some embodiments, the cleaning member 11 comprises a plasma cleaning member 111.

The plasma cleaning member 111 performs plasma cleaning of the articles to be cleaned 100. Plasma cleaning is a kind of dry cleaning, which mainly relies on the "activation effect" of the active ions in the plasma to remove the dirt, dust, etc., on articles to be cleaned 100, so as to prepare for the stacking and welding of battery cells in advance, so as to minimize the defective products of welding.

Figure 10:
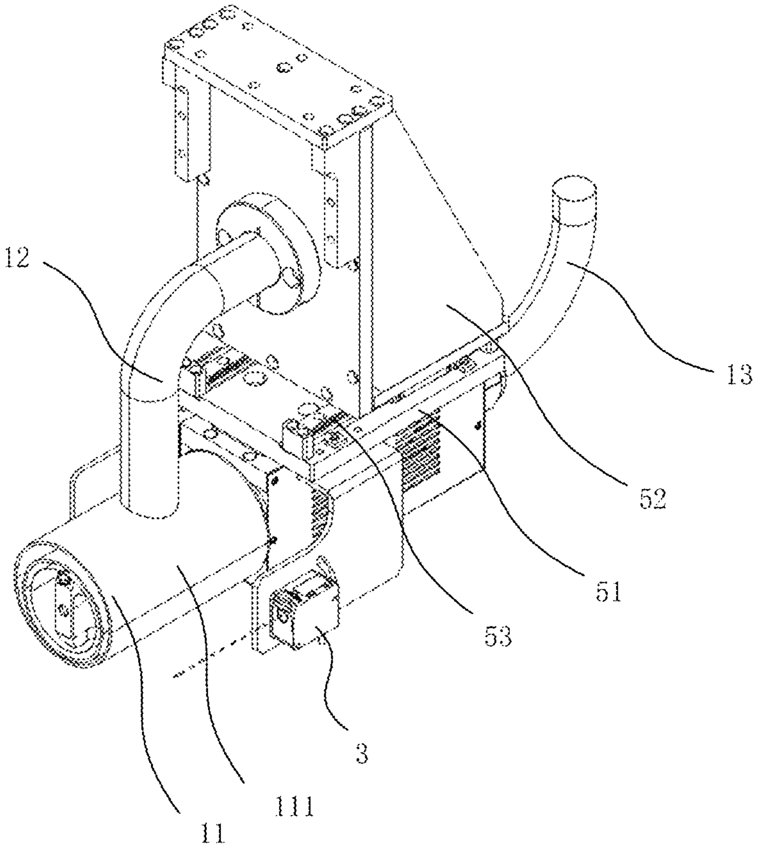
FIG. 10 is a schematic diagram of a cleaning member and an adjusting assembly of the cleaning apparatus according to some embodiments of the present application.
Figure 11:
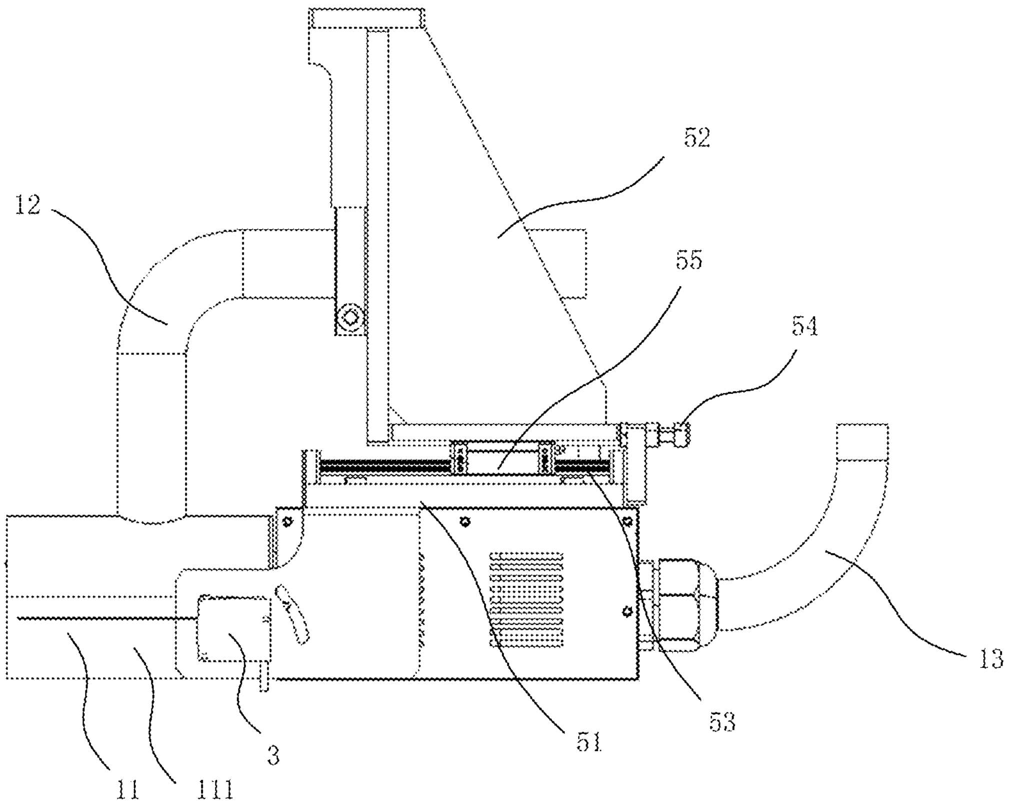
FIG. 11 is a main view schematic diagram of FIG. 10.

Referring to FIGS. 10 and 11, in some embodiments, the cleaning assembly 1 further comprises a first pipeline 12 and a second pipeline 13. Both the first pipeline 12 and the second pipeline 13 are connected to the plasma cleaning member 111. The second pipeline 13 is used to provide a plasma cleaning medium, and the first pipeline 12 is used to pump and drain the cleaned impurities.

Referring to FIGS. 10 and 11, in some embodiments, the cleaning assembly 1 is provided on the second plate 63 of the second drive assembly 6 by the adjusting assembly 5.

The adjusting assembly 5 comprises a mounting plate 51, a connecting member 52, a second guide rail 53, an adjusting member 54 and a slider 55. The connecting member 52 is connected to the second plate 63, the adjusting member 54 is provided on the connecting member 52, and the connecting member 52 is connected to the slider 55, the slider 55 being slidably connected to the second guide rail 53, and the second guide rail 53 being provided on the top of the mounting plate 51. The cleaning assembly 1 is provided at the bottom of the mounting plate 51. The relative movement of the slider 55 and the second guide rail 53 is adjusted by the adjusting member 54, and the second guide rail 53 moves and in turn drives the mounting plate 51 to move, and the mounting plate 51 drives the cleaning member 11 for movement in the third direction Z.

Figure 12:
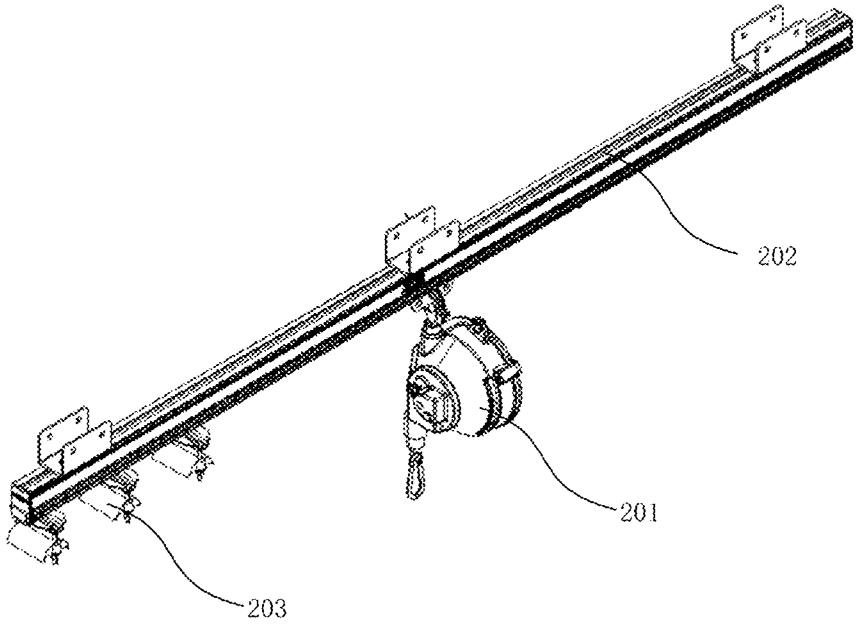
FIG. 12 is a schematic diagram of a suspension assembly of the cleaning apparatus according to some embodiments of the present application.

Referring to FIGS. 7 and 12, in some embodiments, the cleaning apparatus further comprises a suspension assembly 20, the suspension assembly 20 being disposed in the frame body 7, and the suspension assembly 20 being configured to suspend the cleaning pipeline of the cleaning member 11.

In some embodiments, the suspension assembly 20 comprises a suspension member 201, a third guide rail 202 and an auxiliary suspension member 203. The third guide rail 202 is provided on the frame body 7, the suspension member 201 is slidably provided on the third guide rail 202, and the suspension member 201 is configured to suspend the first pipeline 12 and/or the second pipeline 13. The auxiliary suspension member 203 is provided on the third guide rail 202 for assisting in suspending the first pipeline 12 and/or the second pipeline 13.

Referring to FIG. 3, in some embodiments, the cleaning apparatus further comprises a second detecting member 10, the second detecting member 10 being provided at the cleaning assembly 1 and being configured to detect whether the upper surfaces of the at least two articles to be cleaned 100 are flush. In the case where the upper surfaces of the at least two articles to be cleaned 100 are not flush, the at least two articles to be cleaned 100 are leveled.

Some embodiments of the present application further provide a cleaning method for the cleaning apparatus in any of the above embodiments, comprising the step of:

driving the cleaning assembly 1 by the first drive assembly 2 for movement, the two cleaning members 11 of the cleaning assembly 1 cleaning two sides of the at least two articles to be cleaned 100 arranged in sequence.

The cleaning apparatus drives the cleaning assembly 1 by the first drive assembly 2 for movement, wherein the two cleaning members 11 provided opposite to each other are capable of cleaning two sides of the at least two articles to be cleaned 100 arranged in sequence in the course of the movement, resulting in a high degree of automation and a high efficiency of cleaning, which is conducive to realizing a continuous production function and meeting the production takt of the battery production system.

In some embodiments, the cleaning apparatus further comprises a sensor 3 provided in the cleaning assembly 1. The cleaning method further comprises:

detecting, by the sensor 3, the distance between the cleaning members 11 and the articles to be cleaned 100 in the process of cleaning the two sides of the at least two articles to be cleaned 100 arranged in sequence by the two cleaning members 11, and controlling the first drive assembly 2 to stop working when the detected distance value detected by the sensor 3 is less than or equal to the preset distance value.

In the cleaning process, the sensor 3 detects the distance between the cleaning members 11 and the articles to be cleaned 100 in real time, and the detected distance value detected by the sensor 3 can be used to judge whether the distance between the cleaning members 11 and the articles to be cleaned 100 is too small or too large, and when the detected distance value detected by the sensor 3 is less than or equal to the preset distance value, the first drive assembly 2 is controlled to stop working, so that the first drive assembly 2 no longer drives the cleaning assembly 1 for movement, and the cleaning assembly 1 stops the cleaning work; therefore, it is possible to alleviate the problem of the articles to be cleaned 100 being damaged due to the cleaning members 11 touching the articles to be cleaned 100 as a result of the distance between the cleaning members 11 and the articles to be cleaned 100 being too small.

In some embodiments, the cleaning apparatus further comprises a second drive assembly 6. The cleaning method further comprises:

driving, before driving the cleaning assembly 1 by the first drive assembly 2 for movement, the cleaning assembly 1 by the second drive assembly 6 for movement in a first direction X to cause the two cleaning members 11 to be located on two sides of the article to be cleaned 100, and adjust the position of the two cleaning members 11 in the first direction X, where the first direction X intersects respectively with a second direction Y and a third direction Z, the second direction Y being parallel to a direction of arrangement of the at least two articles to be cleaned 100, and the third direction Z being parallel to a direction of arrangement of the two cleaning members 11.

The second drive assembly 6 drives the cleaning assembly 1 for movement in the first direction X and is capable of adjusting the position of the cleaning assembly 1 on the two sides of the article to be cleaned 100 so as to be used for enabling the cleaning assembly 1 to reach the cleaning position and for enabling the two sides of the article to be cleaned 100 to be completely cleaned.

In some embodiments, the cleaning apparatus further comprises a sensor 3 provided in the cleaning assembly 1. The cleaning method further comprises:

detecting, by the sensor 3, the distance between the cleaning members 11 and the articles to be cleaned 100 in the third direction Z in the process of driving the cleaning assembly 1 by the second drive assembly 6 for movement in the first direction X, and controlling the second drive assembly 6 to stop working when the detected distance value detected by the sensor 3 is less than or equal to the preset distance value.

In the process of the second drive assembly 6 driving the cleaning assembly 1 for movement in the first direction X to adjust the position of the cleaning assembly 1 on the two sides of the articles to be cleaned 100, the sensor 3 detects the distance between the cleaning members 11 and the articles to be cleaned 100 in the third direction Z in real time, and when the detected distance value detected by the sensor 3 is less than or equal to the preset distance value, the second drive assembly 6 is controlled to stop working, so that the second drive assembly 6 no longer drives the cleaning assembly 1 for movement; therefore, it is possible to alleviate the problem of the articles to be cleaned 100 being damaged due to the cleaning members 11 touching the articles to be cleaned 100 as a result of the distance between the cleaning members 11 and the articles to be cleaned 100 being too small.

In some embodiments, the cleaning method for the cleaning apparatus comprises the steps of:

the articles to be cleaned 100 are conveyed to the cleaning apparatus by the conveyor apparatus and fed to the conveyor member 9, and after the articles to be cleaned 100 reach the cleaning position, the telescopic member 84 drives the support plate 81 to lift up in order to push up the pallet member 200, so as to disengage the pallet member 200 from the two conveyor members 9, and it is connected to the pallet member 200 by the positioning member 82 and thus can position the pallet member 200; the second drive assembly 6 drives the cleaning assembly 1 to move in the first direction X to cause the cleaning assembly 1 to be located in an upper cleaning position at the two sides of the articles to be cleaned 100, and the first drive assembly 2 drives the cleaning assembly 1 for movement in the second direction Y so that the two cleaning members 11 provided opposite to each other are capable of cleaning the upper half portions of the two sides of the at least two articles to be cleaned 100 arranged in sequence during the movement; and after the cleaning of the upper half portions of the articles to be cleaned 100 is completed, the cleaning assembly 1 is driven by the second drive assembly 6 to move in the first direction X to cause the cleaning assembly 1 to be located in the lower cleaning positions of the two sides of the articles to be cleaned 100, and the first drive assembly 2 drives the cleaning assembly 1 to move in the opposite direction of the second direction Y, so that the two cleaning members 11 provided opposite to each other are capable of cleaning the lower half portions of the two sides of the two articles to be cleaned 100 arranged in sequence in the course of the movement. Whether in the process of the second drive assembly 6 driving the cleaning assembly 1 to move in the first direction X or in the process of the first drive assembly 2 driving the cleaning assembly 1 to move in the second direction Y, the distance between the cleaning members 11 and the articles to be cleaned 100 is detected in real time by the sensor 3, and when the detected distance value is less than or equal to the preset distance value, the cleaning assembly 1 is controlled to stop moving. This alleviates the problem of the articles to be cleaned 100 being damaged due to the cleaning members 11 touching the articles to be cleaned 100 as a result of the distance between the cleaning members 11 and the articles to be cleaned 100 being too small.

Referring to FIGS. 2 to 12, in some specific embodiments, in the process of plasma cleaning, the laser sensor 31 is used to detect the distance between the plasma cleaning member 111 and the battery cell 101 to be cleaned in real time, and if the detected distance value is less than the preset distance value for laser ranging, the firing of the plasma cleaning member 111 is terminated in order to interrupt plasma cleaning, thereby preventing collision of the plasma cleaning member 111 with the battery cell 101 to avoid breakage of the blue film of the battery cell, thus enabling compatibility with battery cells of different sizes.

The spacing between the two plasma cleaning members 111 can be flexibly adjustable according to the size of the battery cell, thus realizing the plasma cleaning of battery cells of different sizes, so as to enable easy model replacement.

The support assembly 8 is used for lifting and positioning the battery cell 101. What is positioned by the support assembly 8 is a pallet member 200 carrying at least two battery cells 101 that flows in by means of a doubling chain (conveyor apparatus). The at least two battery cells 101 carried by the pallet member 200 are referred to as modules to be cleaned.

In some specific embodiments, the cleaning method for the cleaning apparatus comprises the step of:

The modules to be cleaned flow into the plasma cleaning station of the cleaning apparatus and are lifted and positioned by the support plate 81 of the support assembly 8.

The laser sensor 311 measures the distances between the two sides of the module to be cleaned and the cleaning member 11.

The first drive assembly 2 drives the plasma cleaning member 11 to move forward to clean the upper half portions of the two sides of the battery cell, and in the cleaning process, the laser sensor 311 detects the spacing between the plasma cleaning member 111 and the battery cell 101 in real time, and when the detected distance value is less than or equal to the preset distance value, the driving of the first drive assembly 2 is stopped and the firing of the plasma cleaning member 111 is stopped.

After the cleaning of the upper half portions of the two sides of the battery cell is completed, the second drive assembly 6 drives the cleaning assembly 1 to move downwardly to the lower cleaning position, and the first drive assembly 2 drives the plasma cleaning member 11 to move backward to clean the lower half portions of the two sides of the battery cell, and in the cleaning process, the laser sensor 31 detects the spacing between the plasma cleaning member 111 and the battery cell 101 in real time, and when the detected distance value is less than or equal to the preset distance value, the driving of the first drive assembly 2 is stopped and the firing of the plasma cleaning member 111 is stopped.

The support plate 81 of the support assembly 8 is lowered to loosen the module to be cleaned that has been subjected to plasma cleaning, and the module to be cleaned flows out.

The above actions are circulated to complete the cleaning of multiple modules to be cleaned.

In some specific embodiments, the cleaning apparatus uses a laser sensor ranging method to measure the distance between the plasma cleaning member and the battery cell, and the laser ranging measurement value can be adapted to battery cells of different sizes by setting the laser ranging measurement value, so as to enable easy and reliable model replacement and a high detection precision, which results in a good fool proof effect of the plasma cleaning process and enhances the product yield rate.

Some embodiments of the present application further provide a battery production system, comprising a battery cell providing apparatus and the cleaning apparatus as described in any one of the above embodiments, the article to be cleaned 100 comprising a battery cell 101 provided by the battery cell providing apparatus.

The battery production system includes the cleaning apparatus of any of the above embodiments and accordingly has the beneficial effect of the cleaning apparatus.

In some embodiments, at least two battery cells 101 provided by the battery cell providing apparatus are arranged in sequence, and the at least two battery cells 101 are placed as a group of modules to be cleaned on a pallet member 200 and are fed into the cleaning apparatus. The at least two battery cells 101 may be arranged in the cleaning apparatus in a manner consistent with the arrangement in which they are placed within the shell assembly 301 of the battery 300. After the at least two battery cells 101 are cleaned in the cleaning apparatus, they may be placed integrally within the shell assembly 301 without changing the arrangement so as to improve the efficiency of production.

In some embodiments, the at least two battery cells 101 are arranged in a large surface adhering manner.

In some embodiments, the at least two battery cells 101 comprise two, three, four, five, . . . , ten battery cells or more than ten battery cells, and the like. The number of battery cells 101 specifically comprised in the battery 300 may be set according to the specification requirements of the battery.

Although the present application has been described with reference to the preferred embodiments, various improvements can be made thereto and components thereof can be replaced with equivalents without departing from the scope of the present application. In particular, the technical features mentioned in the various embodiments can be combined in any manner as long as there is no structural conflict. The present application is not limited to the specific embodiments disclosed herein, but rather comprises all technical solutions falling within the scope of the claims.

What is claimed is:

1. A cleaning apparatus, comprising:

a cleaning assembly comprising two cleaning members provided opposite to each other, the two cleaning members being plasma cleaning members and configured to form a space therebetween for accommodating at least two articles to be cleaned;

a first drive assembly configured to drive the cleaning assembly for movement to clean two sides of the at least two articles to be cleaned arranged in sequence, a second drive assembly configured to drive the cleaning assembly for movement in a first direction (X), wherein the first direction (X) intersects respectively with a second direction (Y) and a third direction (Z), the second direction (Y) being parallel to a direction of arrangement of the at least two articles to be cleaned, and the third direction (Z) being parallel to a direction of arrangement of the two cleaning members, a sensor provided in the cleaning assembly, the sensor being a laser sensor configured to detect in real time a distance between the cleaning members and the at least two articles to be cleaned, and a controller respectively electrically connected to the sensor and the first drive assembly, the controller being configured to:

control the second drive assembly to move the cleaning assembly in the first direction (X) to an upper cleaning position at two sides of each of the at least two articles;

after the cleaning assembly reaches the upper cleaning positions, control the first drive assembly to drive the cleaning assembly to move in the second direction (Y) so that the plasma cleaning members clean upper half portions of the two sides of each of the at least two articles;

after cleaning of the upper half portions is completed, control the second drive assembly to move the cleaning assembly in the first direction (X) to a lower cleaning position;

after the cleaning assembly reaches the lower cleaning position, control the first drive assembly to drive the cleaning assembly to move in a direction opposite the second direction (Y) so that the plasma cleaning members clean lower half portions of the two sides of each of the at least two articles;

wherein during both movement in the first direction (X) and movement in the second direction (Y), the controller receives the detected distance value from the sensor in real time and controls at least one of the first drive assembly and the second drive assembly to stop movement when the detected distance value is less than or equal to a preset distance value.

2. The cleaning apparatus according to claim 1, further comprising an adjusting assembly configured to adjust the distance between the two cleaning members.

3. The cleaning apparatus according to claim 1, wherein the first drive assembly is drivably connected to the second drive assembly to cause the second drive assembly to move in the second direction (Y), the second drive assembly being connected to the cleaning assembly.

4. The cleaning apparatus according to claim 1, further comprising an adjusting assembly, the adjusting assembly being connected to the second drive assembly and the cleaning assembly, and the adjusting assembly being configured to adjust the distance between the two cleaning members in the third direction (Z).

5. The cleaning apparatus according to claim 1, wherein the sensor is configured to detect the distance between the cleaning members and the at least two articles to be cleaned in the third direction (Z) during the movement of the cleaning assembly in the first direction (X).

6. The cleaning apparatus according to claim 1, further comprising a frame body, the first drive assembly being disposed in the frame body in the second direction (Y), the second drive assembly being disposed in the frame body in the first direction (X), and the cleaning assembly being disposed in the frame body and located on a side of the first drive assembly that is located in the first direction (X).

7. The cleaning apparatus according to claim 1, wherein at least one of the first drive assembly and the second drive assembly comprises a linear servo motor.

8. The cleaning apparatus according to claim 1, further comprising a support assembly that comprises:

a support plate configured to support a pallet member carrying the at least two articles to be cleaned; and a positioning member provided in the support plate and configured to be detachably connected to the pallet member.

9. The cleaning apparatus according to claim 8, further comprising two conveyor members arranged at an interval, the two conveyor members being configured to convey the pallet member; the support assembly being disposed between the two conveyor members, and the support assembly comprising a fixed plate and a telescopic member, wherein the telescopic member connects the fixed plate and the support plate, and the telescopic member is configured to drive the support plate to push up the pallet member to disengage the pallet member from the two conveyor members.

10. The cleaning apparatus according to claim 8, further comprising a frame body, the first drive assembly being disposed in an upper portion within the frame body, the support assembly being disposed in a lower portion within the frame body, and the cleaning assembly being suspended between the first drive assembly and the support assembly.

11. A battery production system, comprising a battery cell providing apparatus and the cleaning apparatus according to claim 1, the article to be cleaned comprising a battery cell provided by the battery cell providing apparatus.

12. A cleaning method comprising: providing the cleaning apparatus of claim 1, driving the cleaning assembly by the first drive assembly for movement, the two cleaning members of the cleaning assembly cleaning two sides of the at least two articles to be cleaned arranged in sequence.

13. The cleaning method for the cleaning apparatus according to claim 12, wherein the cleaning apparatus further comprises the sensor provided in the cleaning assembly, the cleaning method further comprising: detecting, by the sensor, a distance between the cleaning members and the articles to be cleaned in a process of cleaning the two sides of the at least two articles to be cleaned arranged in sequence by the two cleaning members, and controlling the first drive assembly to stop working when the detected distance value detected by the sensor is less than or equal to the preset distance value.

14. The cleaning method for the cleaning apparatus according to claim 12, wherein the cleaning apparatus further comprises the second drive assembly, the cleaning method further comprising: driving, before driving the cleaning assembly by the first drive assembly for movement, the cleaning assembly by the second drive assembly for movement in the first direction to cause the two cleaning members to be located on two sides of the article to be cleaned and adjust a position of the two cleaning members in the first direction, wherein the first direction (X) intersects respectively with a second direction (Y) and a third direction (Z), the second direction (Y) being parallel to a direction of arrangement of the at least two articles to be cleaned, and the third direction (Z) being parallel to a direction of arrangement of the two cleaning members.

15. The cleaning method for the cleaning apparatus according to claim 14, wherein the cleaning apparatus further comprises the sensor provided in the cleaning assembly, the cleaning method further comprising: detecting, by the sensor, the distance between the cleaning members and the articles to be cleaned in the third direction (Z) in the process of driving the cleaning assembly by the second drive assembly for movement in the first direction (X), and controlling the second drive assembly to stop working when the detected distance value detected by the sensor is less than or equal to the preset distance value.

* * * * *